United States Patent
Chen et al.

(10) Patent No.: US 11,416,571 B2
(45) Date of Patent: Aug. 16, 2022

(54) SEARCHABILITY OF INCIDENT-SPECIFIC SOCIAL MEDIA CONTENT

(71) Applicant: MOTOROLA SOLUTIONS, INC., Chicago, IL (US)

(72) Inventors: Li Poh Chen, Butterworth (MY); Kah Jing Lee, Kulim (MY); Yew Tatt Sim, Butterworth (MY); Pei See Toh, Bayan Lepas (MY); Margaret Lee Hing Choo, Bandar Baru Air Itam (MY); Hong Shiong Yeoh, Taiping (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 442 days.

(21) Appl. No.: 16/724,416

(22) Filed: Dec. 23, 2019

(65) Prior Publication Data

US 2021/0191999 A1 Jun. 24, 2021

(51) Int. Cl.
*G06F 16/95* (2019.01)
*G06F 16/9536* (2019.01)
(Continued)

(52) U.S. Cl.
CPC ...... *G06F 16/9536* (2019.01); *G06F 16/9014* (2019.01); *G06F 16/9538* (2019.01);
(Continued)

(58) Field of Classification Search
CPC ............. G06F 16/9536; G06F 16/9014; G06F 16/9538
See application file for complete search history.

(56) References Cited

U.S. PATENT DOCUMENTS 8,457,612 B1 6/2013 Daniell
8,760,290 B2 6/2014 Piett et al.
(Continued)

FOREIGN PATENT DOCUMENTS

EP 2747023 B1 3/2017
EP 3373615 A1 9/2018
WO 2008036102 A1 3/2008

OTHER PUBLICATIONS

The International Search Report and the Written Opinion corresponding patent application No. PCT/US2020/061732 filed Nov. 23, 2020, dated Feb. 18, 2021, all pages.
(Continued)

*Primary Examiner* — Baoquoc N To

(57) ABSTRACT

A process for improving the searchability of incident-specific social media content posted via communication devices. In operation, an electronic computing device obtains incident information identifying an incident location and time of occurrence of the incident. The electronic computing device identifies a communication device located within a predetermined geographical area relative to the incident location during the time of occurrence of the incident. The electronic computing device then generates a concatenated string as a function of incident identifier associated with the incident and device identifier associated with the communication device and transmits an electronic message including the concatenated string to the communication device. The electronic message includes a link to enable the concatenated string to be attached to social media posts including incident-specific social media content posted via the communication device on social media networks.

20 Claims, 10 Drawing Sheets

(51) Int. Cl.
   *G06F 16/901* (2019.01)
   *G06F 16/9538* (2019.01)
   *H04L 51/18* (2022.01)
   *H04L 67/306* (2022.01)
   *H04W 4/02* (2018.01)
   *H04L 51/52* (2022.01)

(52) U.S. Cl.
   CPC .............. *H04L 51/18* (2013.01); *H04L 51/52* (2022.05); *H04L 67/306* (2013.01); *H04W 4/023* (2013.01)

(56) References Cited

U.S. PATENT DOCUMENTS

| | | |
|---|---|---|
| 2006/0184373 A1 | 8/2006 | Kumhyr |
| 2014/0002263 A1 | 1/2014 | Grebner et al. |
| 2014/0188993 A1 | 7/2014 | Klein et al. |
| 2015/0339707 A1 | 11/2015 | Harrison et al. |
| 2016/0210704 A1 | 7/2016 | Fang et al. |
| 2018/0034650 A1 | 2/2018 | Anderson et al. |
| 2019/0095495 A1* | 3/2019 | Venkata Naga Ravi .................... G06F 16/24568 |
| 2019/0122309 A1 | 4/2019 | Goldstein et al. |

OTHER PUBLICATIONS

Marceau, Amelia: "28 Public Safety Hashtags You Should Be Using on Social Media", RAVE—Mobile Safety—https://www.ravemobilesafety.com/blog/public-safety-hashtags-you-should-be-using-on-social-media, Nov. 14, 2018, all pages.

* cited by examiner

| INCIDENT IDENTIFIER (X) | DEVICE IDENTIFIER (Y) | CONCATENATED STRING (Z) Z = "#" + HASH_FN(X) + HASH_FN(Y) "+" DENOTES CONCATENATION |
|---|---|---|
| 110001 | 843A 4BC8 E900 | #4972d45b42830d180360f2a2b5e921e5f67aa18ad09e94dd1 cd0c041fed13290958bae12edfcdb732b50222a8ce5e394e5dc 1bf6d3d813c8be0be21ca8fac70 |
| 110001 | E83E FCCD FF52 | #4972d45b42830d180360f2a2b5e921e5f67aa18ad09e94dd1 cd0c041fed13295141771f91b6e9787d7f641a2799d64bdf9d802 238adc1ff2c86c287423579705 |
| 110001 | 3060 23B4 E093 | #4972d45b42830d180360f2a2b5e921e5f67aa18ad09e94dd1 cd0c041fed13329e1aa11be656249bfbcbd28bcb6ffaed653370e c14c3a245b623a10a321bb1b02 |
| 110002 | E483 991D 23F5 | #9e2adb8e95b6d4f0d645ad02c8cbd935ec7701ec5da22557ec 5411c46e9c7f4afa382ea7635c6230f6a6a2a5c855630c0d93d2b ba0daacfc95cd09592b733c8f5 |
| 110002 | E483 991C F673 | #9e2adb8e95b6d4f0d645ad02c8cbd935ec7701ec5da22557ec 5411c46e9c7f4a326754b58199b6c6b5148142580741031553d c736e1387dccb33e24521cff87d |
| ... | ... | ... |

*FIG. 4*

| INCIDENT IDENTIFIER (X) | DEVICE IDENTIFIER (Y) | CONCATENATED STRING (Z) Z = "#" + HASH_FN(X + Y) "+" DENOTES CONCATENATION |
|---|---|---|
| 110001 | 843A 4BC8 E900 | #dd109d45f5bcbd276ff8b7b0660b25ea9199b90eb1cd0fe8138ebb888fd2af52 |
| 110001 | E83E FCCD FF52 | #9d880f7027ae2e6f0cf66f0427bcf4c781bfb08453717d9e6c49574783734f2e |
| 110001 | 3060 23B4 E093 | #17092481a3a78ae9f62d96221bbc619c735b84270c616eb8006dd2475544a058 |
| 110002 | E483 991D 23F5 | #5610e02c13ee5f15fe391a96410 26ff58a79985d55410edc106df8c4d45efd2 |
| 110002 | E483 991C F673 | #c2d79cac3fbf6c360d02e7d95c56a34d7b6902b06b9e9b9ffefb4c47ca35bd21 |
| 110003 | 3060 23B4 E093 | #98bbfc46078a387250dc4dd8246a8e21d5d5b805985b286e20b5817f3103bd57 |
| ... | ... | ... |

*FIG. 5*

| INCIDENT IDENTIFIER (X) | DEVICE IDENTIFIER (Y) | CONCATENATED STRING (Z)<br>Z = "#" + HASH_FN(HASH_FN(X) + HASH_FN(Y))<br>"+" DENOTES CONCATENATION |
|---|---|---|
| 110001 | 843A 4BC8 E900 | #e18ce7acc23fabd7cb984d2f51f8453b161b16ef4393c23a1d03fa8be2cf8ca8 |
| 110001 | E83E FCCD FF52 | #7ad3c45574853da5b756a40df8e5cf989fc576ee6651584c673c7d514a5d6068 |
| 110001 | 3060 23B4 E093 | #644e55aee2507e5cce1d5f79c33e0f61d7b308ecf4ce3a6d069fffe6e6a01bf2 |
| 110002 | 843A 4BC8 E900 | #b6cb0c28d03042fdbb8a3f482ca7c71e11a404910b2d7bd674f6a6c6cab1ab8b |
| 110002 | E483 991C F673 | #baa7ff3e09230ca57e3a0d1d99624ab8e9911854c6da1c4db6cc009bbd250b1c |
| 110003 | 3060 23B4 E093 | #a9d0e9d1bcc3adebc98857790fb5809aa802195e1dccb3ac255f66da36a21ca3 |
| ... | ... | ... |

*FIG. 6*

SEARCHABILITY OF INCIDENT-SPECIFIC SOCIAL MEDIA CONTENT

BACKGROUND OF THE INVENTION

Social media networks allow people to create, share or exchange information, ideas, photos, and videos. A significant amount of people now use social media as their primary news source and people often create their own news stories by posting pictures and videos of current events that they participate and public safety incidents that they witness. Law enforcement agencies have also begun to track social media postings to collect crucial information about on-going and past incidents. However, since social media is used to share information about a variety of topics, searching the social media content to find relevant incident information may be a challenge for law enforcement agencies.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 4 illustrates an example of concatenated string mapping information maintained by the electronic computing device of FIG. 1 in accordance with some embodiments.

FIG. 5 illustrates another example of concatenated string mapping information maintained by the electronic computing device of FIG. 1 in accordance with some embodiments.

FIG. 6 illustrates yet another example of concatenated string mapping information maintained by the electronic computing device of FIG. 1 in accordance with some embodiments.

Figure 1:
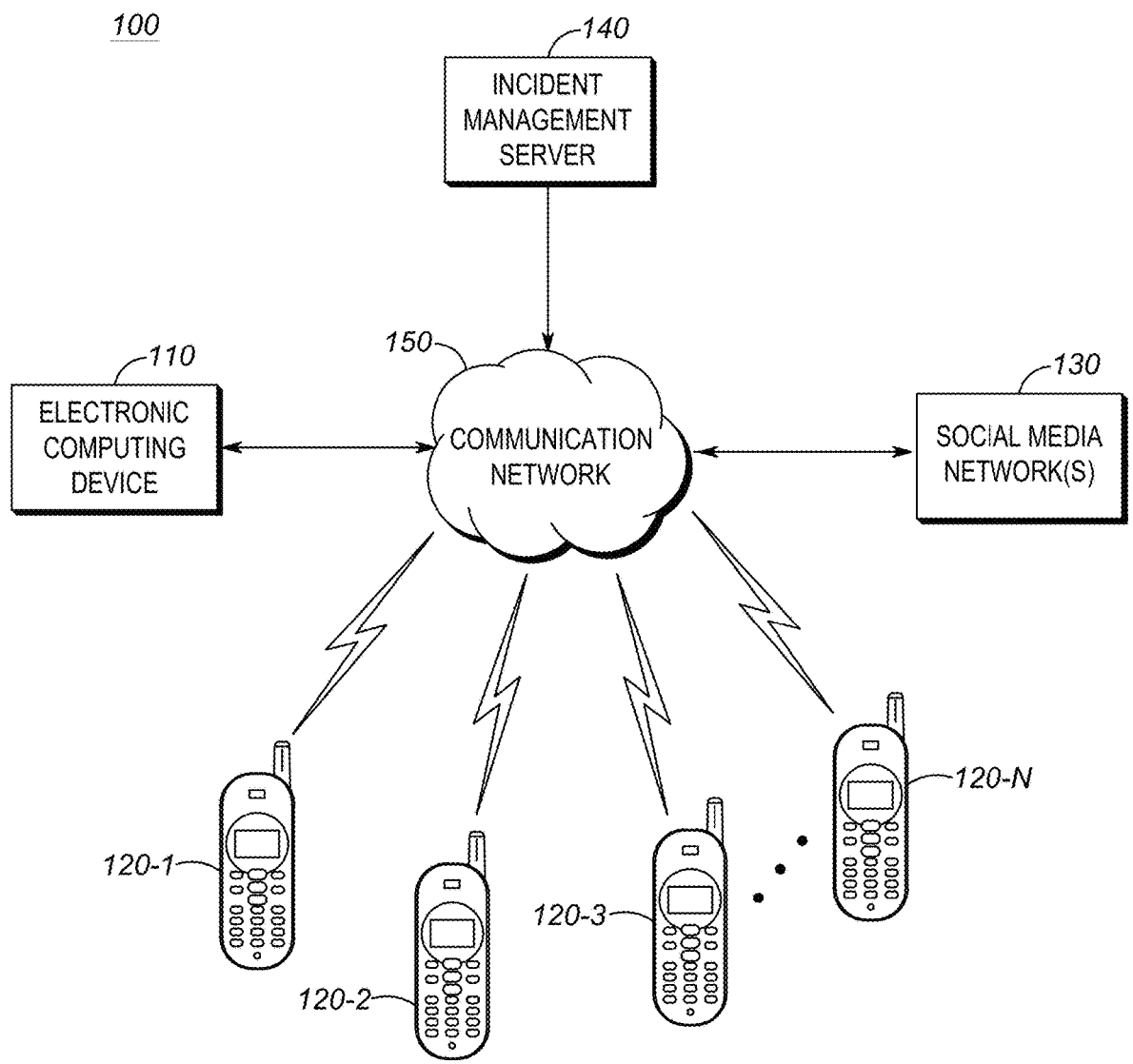
FIG. 1 is a system diagram illustrating a system of improving the searchability of incident-specific social media content posted via particularly identified communication devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When users post their content on a social media network, they often create labels to express their feelings or to provide a context corresponding to the posted content. An example of a label is a hashtag that users create by prefixing the hash character (#) to a word or un-spaced phrase. When users search for social media content by including a particular hashtag in their search query, social media postings that are tagged to the same hashtag are arranged and presented to the users. Hashtags allow for logically grouping similarly tagged social media postings and an electronic search of a particular hashtag returns relevant social media postings that are tagged under the same hashtag.

Even though hashtags provide for logically grouping and searching similarly tagged social media postings, an electronic search of hashtags may also return social media postings that may be irrelevant to the user. Since hashtags are created by users, different users may be creating same or similar hashtags to tag social media content that may correspond to unrelated events or incidents. So, finding a relevant social media content using such hashtags created by different users for tagging unrelated events may pose a challenge. In case of emergency incidents (e.g., a public safety incident such as a fire incident), obtaining accurate information in a timely manner is crucial for public safety agencies. Further, conventional search engines do not provide a way to control the creation or use of hashtags to find relevant social media postings that are specifically tagged to a particular incident and further posted via particularly identified communication devices that were operated by corresponding users who were actually located at or near an incident location at the time of occurrence of the incident. Accordingly, there is a technological need to improve the searchability of incident-specific social media content posted via communication devices that were particularly identified as located at or near the incident scene at the time of occurrence of the incident.

One embodiment provides a method of improving the searchability of incident-specific social media content posted via communication devices. The method includes: obtaining, at an electronic computing device, incident information identifying an incident location associated with an incident and time of occurrence of the incident; identifying, at an electronic computing device, at least one communication device located within a predetermined geographical area relative to the incident location during a time of occurrence of the incident; generating, at the electronic computing device, a concatenated string as a function of a first identifier associated with the incident and a second identifier associated with the at least one communication device; and transmitting, at the electronic computing device, an electronic message including the concatenated string to the at least one communication device, the electronic message including a link to enable the concatenated string to be attached to one or more social media posts including incident-specific social media content posted via the at least one communication device on at least one of a plurality of social media networks.

A further embodiment provides an electronic computing device including a transceiver and an electronic processor communicatively coupled to the transceiver. The electronic processor is configured to: obtain incident information identifying an incident location associated with an incident and time of occurrence of the incident; identify at least one communication device located within a predetermined geographical area relative to the incident location during a time of occurrence of the incident; generate a concatenated string as a function of a first identifier associated with the incident and a second identifier associated with the at least one communication device; and transmit, via the transceiver, an electronic message including the concatenated string to the at least one communication device, the electronic message including a link to enable the concatenated string to be attached to one or more social media posts including incident-specific social media content posted via the at least one communication device on at least one of a plurality of social media networks.

Each of the above-mentioned embodiments will be discussed in more detail below, starting with example system and device architectures of the system in which the embodiments may be practiced, followed by an illustration of processing steps for achieving the method of improving the searchability of incident-specific social media content posted via particularly identified communication devices. Further advantages and features consistent with this disclosure will be set forth in the following detailed description, with reference to the figures.

Referring now to the drawings, and in particular FIG. 1, which depicts a schematic view of a system 100 including an electronic computing device 110 that is configured to improve the searchability of incident-specific social media content posted via one or more communication devices 120-1 through 120-N on one or more social media networks 130. In accordance with some embodiments, the system 100 further includes an incident management server 140 that may host incident information associated with incidents, for example, public safety incidents such as a fire incident, robbery, vehicle collision, etc. Wired or wireless air-interface communication links communicatively couple the electronic computing device 110, communication devices 120, social media networks 130, and incident management server 140 via a communication network 150. The communication network 150 may include a wired or wireless network, or a combination of wired and wireless networks, or any public safety network (e.g., land mobile radio (LMR) network, long-term evolution (LTE) network, etc.,) operated by a government or private organization.

In accordance with some embodiments, the electronic computing device 110 is operated, for example, by public safety agencies, to generate a unique string (e.g., hashtag) for each particularly identified communication device 120 to post social media content corresponding to a particularly identified incident. As used herein, the term "particularly identified incident" corresponds to an incident selected by the electronic computing device (automatically or in response to user input) in order to identify a particular communication device 120 that was operating at the time of occurrence of the incident and to create a unique string for the purpose of improving the searchability of social media content that is captured corresponding the selected incident and posted by the user via the identified communication device 120. Further, the term "particularly identified communication device" corresponds to a communication device 120 that is selected by the electronic computing device 110 (automatically or in response to user input) to request the communication device 120 to post social media content that is tagged to a string that was uniquely created for the communication device 120 for posting social media content that was captured corresponding to a particular incident. Accordingly, the unique string is generated as a function of an incident identifier associated with the particularly identified incident and an identifier associated with each particularly identified communication device 120. Further, since the unique string is different for different communication devices 120 and also for different incidents, the unique string improves the searchability of social media content (i.e., a social media content that is posted corresponding to a specific incident) by retrieving only those social media posts that are posted corresponding to the particularly identified incident via the particularly identified communication devices 120 by tagging the unique string.

The communication devices 120-1 through 120-N include communication devices that are typically carried by users for their day-to-day communications. The plurality of communication devices can be interchangeably referred to, collectively, as communication devices 120, and generically as a communication device 120. The communication devices 120 may be a mobile phone, laptop, tablet, desktop computer, smart watch or another computing device that is configured to communicate with one or more social media networks 130 via the communication network 150. In accordance with some embodiments, web browsers or social media applications installed on the communication devices 120 provide user interfaces to enable users to log into their social media profile and further post (i.e. to upload and share with a public or a private group) social media content on social media networks 130. The social media content may include audio, video, text, photos, or any combination thereof, and are often instantly accessible or searchable through communication devices 120 of other users via the communication network 150. In accordance with embodiments, incident-specific social media content refers to content such as audio, video, or text that are included within social media posts that are publicly accessible so that public safety agencies can search and retrieve content that were captured by particularly identified communication devices 120 that were operating at or near an incident location at the time of occurrence of an incident. The social media network 130 may refer to any online service or platform (e.g., Facebook, Instagram, Twitter, etc.,) that allows users to create and share content with other public and private user groups.

The electronic computing device 110 may correspond to a communication device, operated by a public safety officer such as a battery-powered portable radio used for narrowband and/or broadband direct-mode or infrastructure communications. In one embodiment, the electronic computing device 110 may be an infrastructure operated by public safety agencies specifically for the purpose of improving the searchability of incident-specific social media content posted via one or more communication devices 120 on one or more social media networks 130. In accordance with embodiments, the electronic computing device 110 identifies a particular one or more communication devices 120, for the purpose of generating a unique string for improving the searchability of incident-specific social media content, based on incident information. For example, the electronic computing device 110 obtains incident information identifying an incident location associated with an incident and time of occurrence of the incident, and further identifies a particular one or more communication devices 120 that were operating in a geographical area relative to the incident location at the time of occurrence of the incident.

In accordance with embodiments, the electronic computing device 110 or a similar device also provides a search mechanism to users (e.g., public safety agency operators) to enable them to search incident-specific social media content. For example, the user may enter a search query including keywords identifying or representing the unique string, identifier (also referred to as device identifier) associated with the communication device 120, or identifier (also referred to as incident identifier) associated with the incident. The incident identifier may be a computer aided dispatch (CAD) identifier that is generated, for example, by an incident management server 140 when the incident is reported. The electronic computing device 110 processes the search query and responsively searches the social media content uploaded on social media networks 130 to retrieve one or more social media posts including incident-specific social media content to which the unique string is attached. The electronic computing device then provides a visual or audio output indicating the retrieved social media post to which the unique string is attached. Alternatively, the electronic computing device may also upload the retrieved social media post to which the unique string is attached, to an evidence database (not shown) that is maintained by the incident management server 140.

Figure 2:
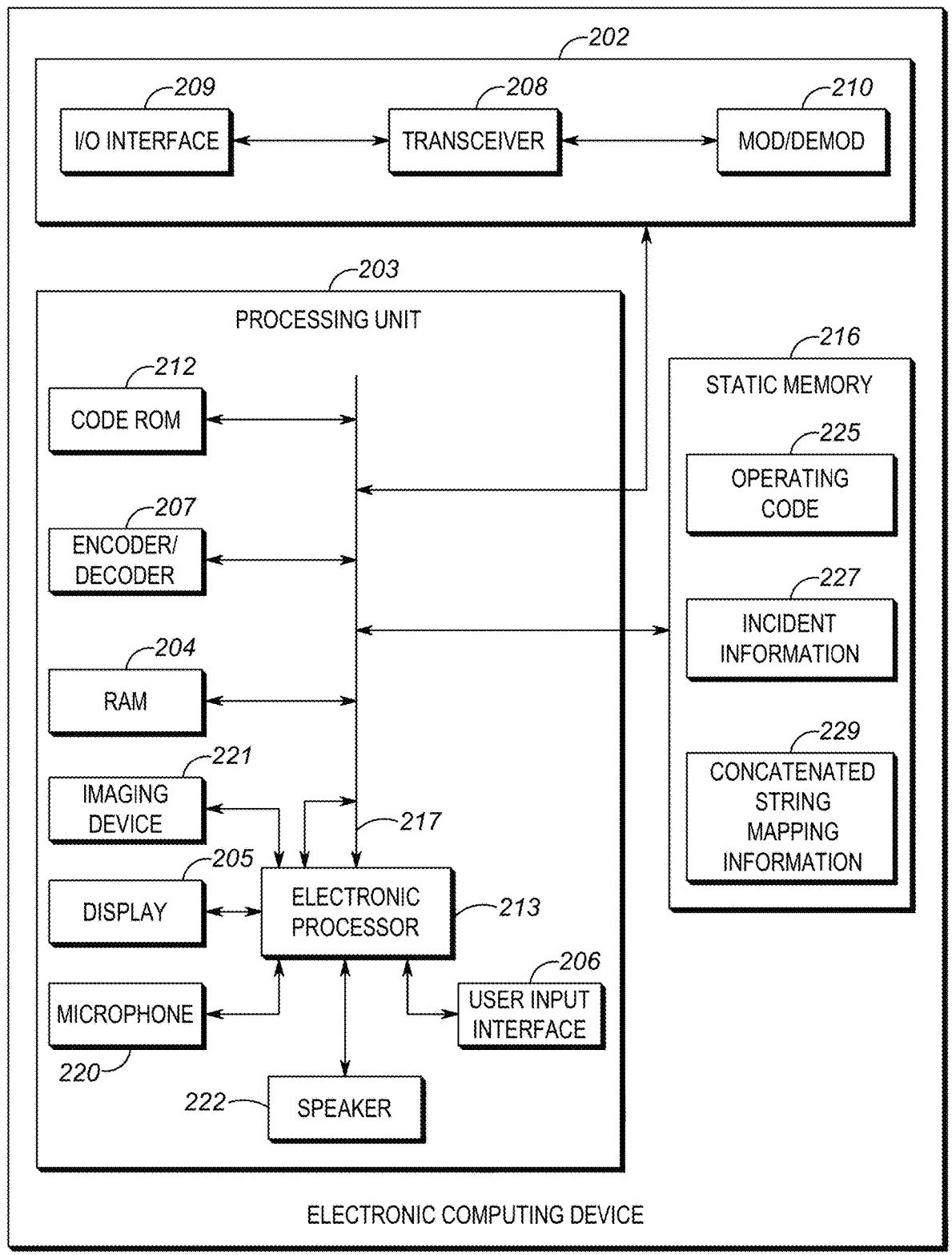
FIG. 2 is a device diagram showing a device structure of an electronic computing device employed in the system of FIG. 1 in accordance with some embodiments.

Now referring to FIG. 2, a schematic diagram illustrates an electronic computing device 200 according to some embodiments of the present disclosure. The electronic computing device 200 performs the functions of the electronic computing device 110 shown in FIG. 1, and may be embodied in one or more electronic communication devices operated by public-safety agencies, or some other communication device not illustrated in FIG. 1, and/or may be a distributed communication device across two or more of the foregoing (or multiple of the same type of one of the foregoing) and linked via a wired and/or wireless communication link(s).

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as an infrastructure controller (e.g., for the purpose of generating a unique concatenated string) may not include one or more of the screen 205, user input interface 206, microphone 220, imaging device 221, and speaker 222. As another example, in some embodiments, the electronic computing device 200 acting as a communication device (e.g., for searching incident-specific social media content) operated by a public safety officer may include one or more of the screen 205, user input interface 206, microphone 220, imaging device 221, and a speaker 22. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device, for example, to enter a search query to search for incident-specific social media content), each coupled to be in communication with the processing unit 203.

An audio and/or video capture device (microphone 220 and/or imaging device 221) is implemented at the electronic computing device 200 for capturing real-time digital audio and/or video stream from a user. For example, the microphone 220 may be present for capturing audio from a user operating the device 200 and/or other environmental or background audio and/or is transmitted as voice or audio stream data, or as acoustical environment indications, by communications unit 202 to other portable radios and/or other communication devices. As another example, the microphone 220 may be used to capture a search query that is audibly input by the user for retrieving incident-specific social media content. In accordance with some embodiments, the search query may be processed by the electronic computing device 200 to extract keywords identifying or representing one or more of: incident identifier, device identifier, or concatenated string (i.e., a unique string created for the purpose of searching incident-specific social media content uploaded on social media network 130). The imaging device 221 provides video (still or moving images) of the electronic computing device 200 for further processing by the processing unit 203 and/or for further transmission by the communications unit 202. A speaker 222 may be present for reproducing audio that is decoded from voice or audio streams of calls received via the communications unit 202 from digital audio stored at the electronic computing device 200, from other ad-hoc or direct mode devices, and/or from an infrastructure RAN device, or may playback alert tones or other types of pre-recorded audio. In accordance with some embodiments, the speaker 222 (also referred herein as an audio output device) provides an audio output corresponding to incident-specific social media content that is retrieved in response to the search query input by the user.

The processing unit 203 may include a code Read Only Memory (ROM) 212 coupled to the common data and address bus 217 for storing data for initializing system components. The processing unit 203 may further include an electronic processor 213 (for example, a microprocessor or other electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other devices, such as the communication devices 120, social media networks 130, and the incident management server 140. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210 that is coupled to an encoder/decoder 207 of the processing unit 203.

The one or more electronic processors 213 (also referred to herein as a microprocessor) has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In one embodiment, the static memory 216 further stores incident information 227 that may be obtained from the incident management server 140 shown in FIG. 1. The incident information 227 includes, for each incident, an incident identifier associated with the incident, incident location, and time of occurrence of the incident. In accordance with some embodiments, the static memory 216 stores incident information 227 for each incident identified by a user (e.g., a public safety agency officer) for the purpose of improving the searchability of social media content that were uploaded corresponding to the identified incident. The electronic computing device 200 generates, for each identified pair of communication device and incident, a unique concatenated string as a function of the incident identifier and device identifier. Examples of generating the unique concatenated string using different functions are illustrated in FIGS. 4 through 6. The electronic computing device 200 then stores, at the static memory 216, concatenated string mapping information 229 that maps each pair of communication device and incident (i.e., device identifier and incident identifier) to the resulting concatenated string. The electronic computing device 110 then generates an electronic message and transmits, via the transceiver 208, the electronic message (e.g., via short message service (SMS) or other unicast messaging services) including the unique string to the communication device 120. In accordance with embodiments, the electronic message also includes a link to enable the unique string to be attached to one or more social media posts including incident-specific social media content posted via the receiving communication device 120 on at least one of the social media networks 130.

Figure 3:
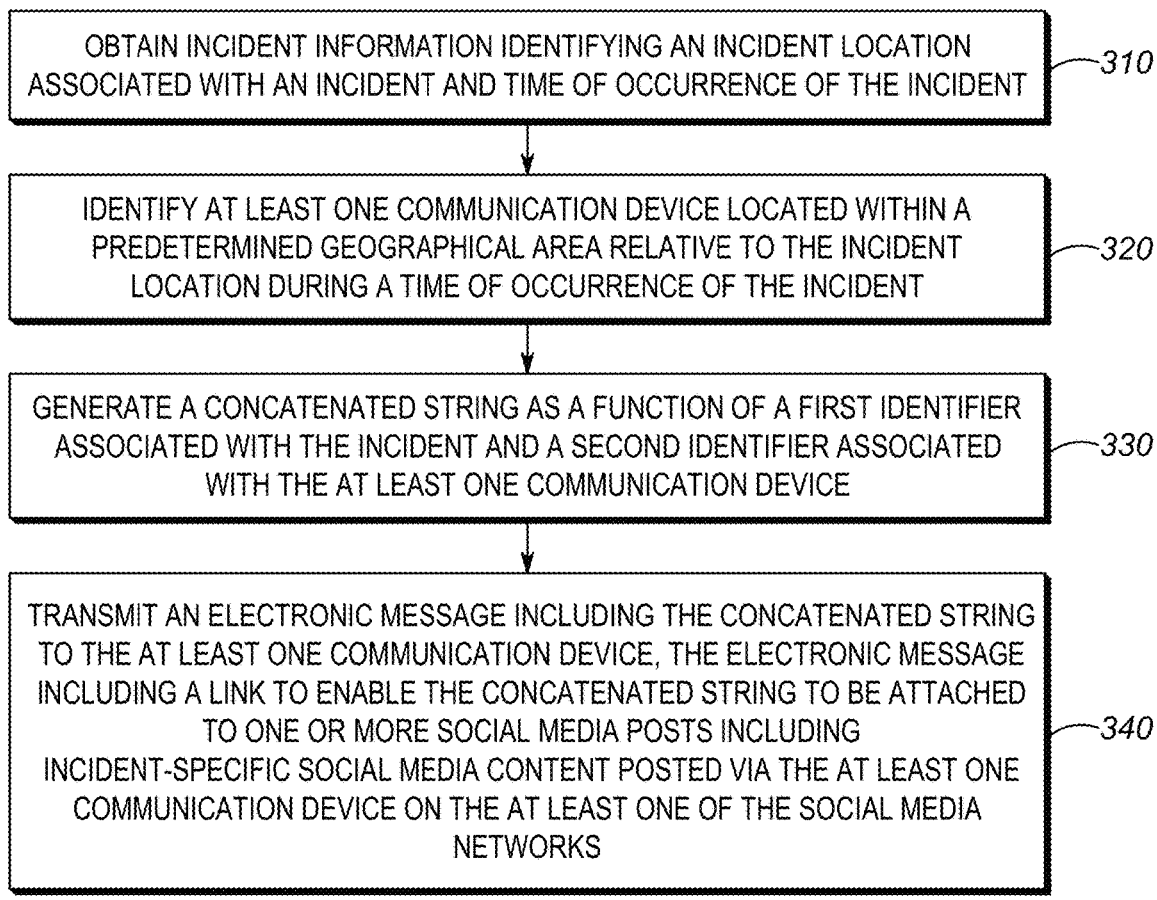
FIG. 3 illustrates a flow chart setting forth process blocks for improving the searchability of incident-specific social media content posted via particularly identified communication devices in accordance with some embodiments.

Turning now to FIG. 3, a flowchart diagram illustrates a process 300 for improving the searchability of incident-specific social media posted via particularly identified communication devices 120 in accordance with some embodiments. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 110 of FIG. 1 and/or the electronic computing device 200 of FIG. 2, and embodied as a singular electronic computing device or distributed electronic computing device may execute process 300. The electronic computing device may execute the process 300 at power-on, at some predetermined periodic time period thereafter, in response to a trigger raised locally at the device via an internal process or via an input interface (e.g., the user enabling a particular feature associated with the process 300 or the computing device detecting that an incident has occurred), or in response to a trigger from the incident management server 140 to which the electronic computing device is communicably coupled, among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device obtains incident information related to an incident. The incident information identifies an incident location associated with the incident and time of occurrence of the incident. In one embodiment, the electronic computing device obtains incident information in the form of structured electronic data from the incident management server 140 shown in FIG. 1. In some embodiments, the electronic computing device obtains incident information in the form of audio or video data that is obtained through sources such as surveillance cameras, call data associated with 911 emergency call, or talk group conversations between a dispatcher and responder. In these embodiments, the electronic computing device processes the audio or video data such as conversations to extract specific incident information such as the incident location and a time of occurrence of the incident. For example, the electronic computing device parses call data using a natural language processing (NLP) engine to determine the incident location and time of occurrence of the incident.

In any case, after the electronic computing device obtains incident information specifically identifying the incident location and time of occurrence of the incident, at block 320, the electronic computing device identifies at least one communication device 120 located within a predetermined geographical area relative to the incident location at the time of occurrence of the incident. In accordance with some embodiments, the electronic computing device selects a geographical area relative to the incident location and obtains a list of communication devices 120 that are located within the geographical area. The geographical area may correspond to an area that is within a predetermined distance (e.g., 500 meters) from the incident location, or alternatively may be selected based on other criteria such as the location of a cell site (e.g., base station) near the incident location. In order to obtain the list of communication devices 120 that are located within the selected geographical area, the electronic computing device may communicate with one or more service providers (e.g., cellular carriers and internet service providers) that provide wired or wireless communication services to communication devices 120 operating in one or more service areas (e.g., a coverage area associated with a cell site) overlapping the geographical area. In particular, the electronic computing device may send a request identifying the particular geographical area for which the list of communication devices 120 operating in the geographical area is needed. The request may also include credential (e.g., security certificate) of the electronic computing device to indicate that the request is originating from the device on behalf of an agency that is authorized to receive location information of the communication devices 120. In response to this request, each requested service provider may verify the credential of the electronic computing device and transmit (via their respective communication infrastructure) a respective list of communication devices 120 that were operating in the geographical area at the time of occurrence of the incident.

In accordance with embodiments, the service providers share the list of communication devices 120 corresponding to only those users who have provided permission to share their location information and further subscribed to receive unique concatenated strings for the purposes of posting incident-specific social media via their respective communication devices 120. In one embodiment, the information received from the service providers may include, for each communication device 120 included in the list, an identifier (e.g., international mobile station equipment identity (IMEI), a phone number, a media access control (MAC) address, a subscriber identity module (SIM) identifier, a user identifier, or another unique identifier temporarily created for the purpose of generating the unique concatenated string) associated with the communication device 120 and location information (e.g., a location coordinate identifying a position of the communication device 120 at the time of occurrence of the incident, an approximate location information (e.g., street address) or a proxy location representing the location of the cell site) associated with the communication device 120.

In accordance with some embodiments, the electronic computing device 200 may select one or more of the communication devices 120 (also referred to as particularly identified communication devices) from the list of communication devices 120 that were identified as operating in a geographical area relative to the incident location associated with an incident. For example, the electronic computing device 200 may select a particular communication device 120 based on information (depending on whether the communication device 120 has provided permission to the service provider to share information with the electronic computing device) related to one or more of: a duration of the time that the communication devices 120 were located in the geographical area at the time of occurrence of the incident, distance between a specific location (if provided by the service provider) of the communication device 120 and a location of the incident scene, a position of the communication device 120, user's accessibility to social media network and/or communication device 120 capability to capture and/or post social media content, and the like. As an example, the electronic computing device may select a particular communication device 120 over another communication device operating in the same geographical area when the particular communication device 120 was determined to be relatively closer (when compared to the other communication device) to the incident scene. As another example, the electronic computing device may select a particular communication device 120 over another communication device operating in the same geographical area when the communication device 120 was determined to be in a better position (e.g., unobstructed field of view to the incident scene) to capture an audio or video data corresponding to the incident scene when compared to the position of the other communication device. As yet another example, the electronic computing device may select a particular communication device 120 over another communication device operating in the same geographic area when the particular communication device 120 has the capability (e.g., network capability, audio/video recording capability, social media network access etc.,) to capture and post social media content. In other embodiments, the electronic computing device selects all or a subset of the communication devices 120 that were operating in the geographical area and performs the functions described in blocks 330 and 340 for each communication device operating in the geographical area.

The electronic computing device 110 then proceeds to block 330 to generate a unique concatenated string for the communication device 120 identified at block 620. The concatenated string is generated as a function of a first identifier (i.e., incident identifier) associated with the incident and a second identifier (i.e., device identifier) associated with the communication device 120. In accordance with embodiments, the electronic computing device may generate concatenated strings such as hashtags by applying hash and concatenation functions in different ways as described below with reference to FIGS. 4 through 6 to generate the resulting concatenated string for a given pair of communication device and incident.

FIG. 4 shows one example 400 of concatenated string mapping information 229 that is generated by the electronic computing device 110, 200 and stored at the static memory 216. The concatenated string mapping information 229 shown in FIG. 4 includes an incident identifier field 410 identifying different incident identifiers associated with respective incidents, device identifier field 420 identifying device identifiers associated with respective communication devices 120 that are selected/identified as operating within the geographical areas associated with the respective incidents, and concatenated string field 430 identifying a concatenated string that is generated as a function of the incident identifier and device identifier. In one embodiment, as shown in the example in FIG. 4, the electronic computing device may generate the unique concatenated string by first applying a hash function to the incident identifier and the device identifier to generate a first hash value and a second hash value, respectively. Then the first and second hash values are concatenated to generate a concatenated string using a concatenate function, wherein the concatenated string is a combination of the two hash values. A symbol such as "#" or other symbol may then be prepended to the combined hash values to generate the resulting concatenated string. In the example shown in FIG. 4, each concatenated string is generated using the following function: Z="#"+HASH_FN(X)+HASH_FN(Y), where "Z" is the resulting concatenated string, "X" is the incident identifier (e.g., a CAD identifier), "Y" is the device identifier (e.g., MAC identifier of a communication device 120), "+" denotes a concatenate function, HASH_FN( ) may be any suitable hash function (e.g., SHA-256) that generates a unique hash value for a given input value. FIG. 4 also illustrates that the resulting concatenated string included in the field 430 is unique for each combination of incident identifier and device identifier.

FIG. 5 shows another example 500 of concatenated string mapping information 229 that is generated by the electronic computing device 110, 200 and stored at the static memory 216. The concatenated string mapping information 229 shown in FIG. 5 includes an incident identifier field 510 identifying different incident identifiers associated with respective incidents, device identifier field 520 identifying device identifiers that are selected/identified as operating within the geographical areas associated with the respective incidents, and concatenated string field 530 identifying a concatenated string that is generated as a function of the incident identifier and device identifier. In one embodiment, as shown in the example in FIG. 5, the electronic computing device may generate the unique concatenated string by first concatenating the incident identifier and device identifier using a suitable concatenate function to generate a pre-concatenated string and then applying a hash function to the pre-concatenated string to generate a hash value. A symbol such as "#" or other symbol may then be prepended to the hash value to generate the resulting concatenated string. In the example shown in FIG. 5, each concatenated string is generated using the following function: Z="#"+HASH_FN (X+Y), where "Z" is the resulting concatenated string, "X" is the incident identifier (e.g., a CAD identifier), "Y" is the device identifier (e.g., MAC identifier of a communication device 120), "+" denotes a concatenate function, HASH_FN ( ) may be suitable hash function (e.g., SHA-256) that generates a unique hash value for a given input value. FIG. 5 also illustrates that the resulting concatenated string included in the field 530 is unique for each combination of incident identifier and device identifier.

FIG. 6 shows yet another example 600 of concatenated string mapping information 229 that is generated by the electronic computing device 110, 200 and stored at the static memory 216. The concatenated string mapping information 229 shown in FIG. 6 includes an incident identifier field 610 identifying different incident identifiers associated with respective incidents, device identifier field 620 identifying device identifiers that are selected/identified as operating within the geographical areas associated with the respective incidents, and concatenated string field 630 identifying the concatenated string that is generated as a function of the incident identifier and device identifier. In one embodiment, as shown in the example in FIG. 6, the electronic computing device may generate the unique concatenated string by first applying a hash function to the incident identifier and the device identifier to generate a first hash value and a second hash value, respectively. Then the first and second hash values are concatenated to generate a pre-concatenated string using a concatenate function, where the pre-concatenated string is further input to a hash function to generate a hash value. A symbol such as "#" or other symbol may then be prepended to the hash value to generate the resulting concatenated string. In the example shown in FIG. 6, each concatenated string is generated using the following function: Z="#"+HASH_FN(HASH_FN(X)+HASH_FN(Y)), where "Z" is the resulting concatenated string, "X" is the incident identifier (e.g., CAD identifier), "Y" is the device identifier (e.g., MAC identifier of a communication device 120), "+" denotes a concatenate function, HASH_FN ( ) may be any suitable hash function (e.g., SHA-256) that generates a unique hash value for a given input value. FIG. 6 also illustrates that the resulting concatenated string included in the field 630 is unique for each combination of incident identifier and device identifier.

Returning to FIG. 3, after generating the unique concatenated string based on the incident identifier associated with the incident and device identifier associated with the incident, the electronic computing device proceeds to block 340 to transmit an electronic message (e.g., a short message service (SMS) message) including the unique concatenated string to the communication device 120 identified at block 320. In one embodiment, the electronic computing device, instead of transmitting the electronic message directly to the communication device 120, transmits the electronic message including the identified concatenated string to the service provider that provides communication services to the communication device 120. In this embodiment, the service provider then forwards the electronic message, for example, as an SMS message, to the communication device 120. In some embodiments, the electronic message sent to the communication device 120 also includes information related to the incident for which social media content is requested to be uploaded via the communication device 120.

In accordance with some embodiments, the electronic message also includes a link to enable the unique string to be attached to one or more social media posts including incident-specific social media content posted via the receiving communication device 120 (i.e., communication device 120 receiving the electronic message) on one or more social media networks 130. Now referring to FIG. 7, an example workflow 700 is shown to illustrate a process of uploading social media content via a communication device 120 receiving the electronic message using the concatenated string.

Figure 7:
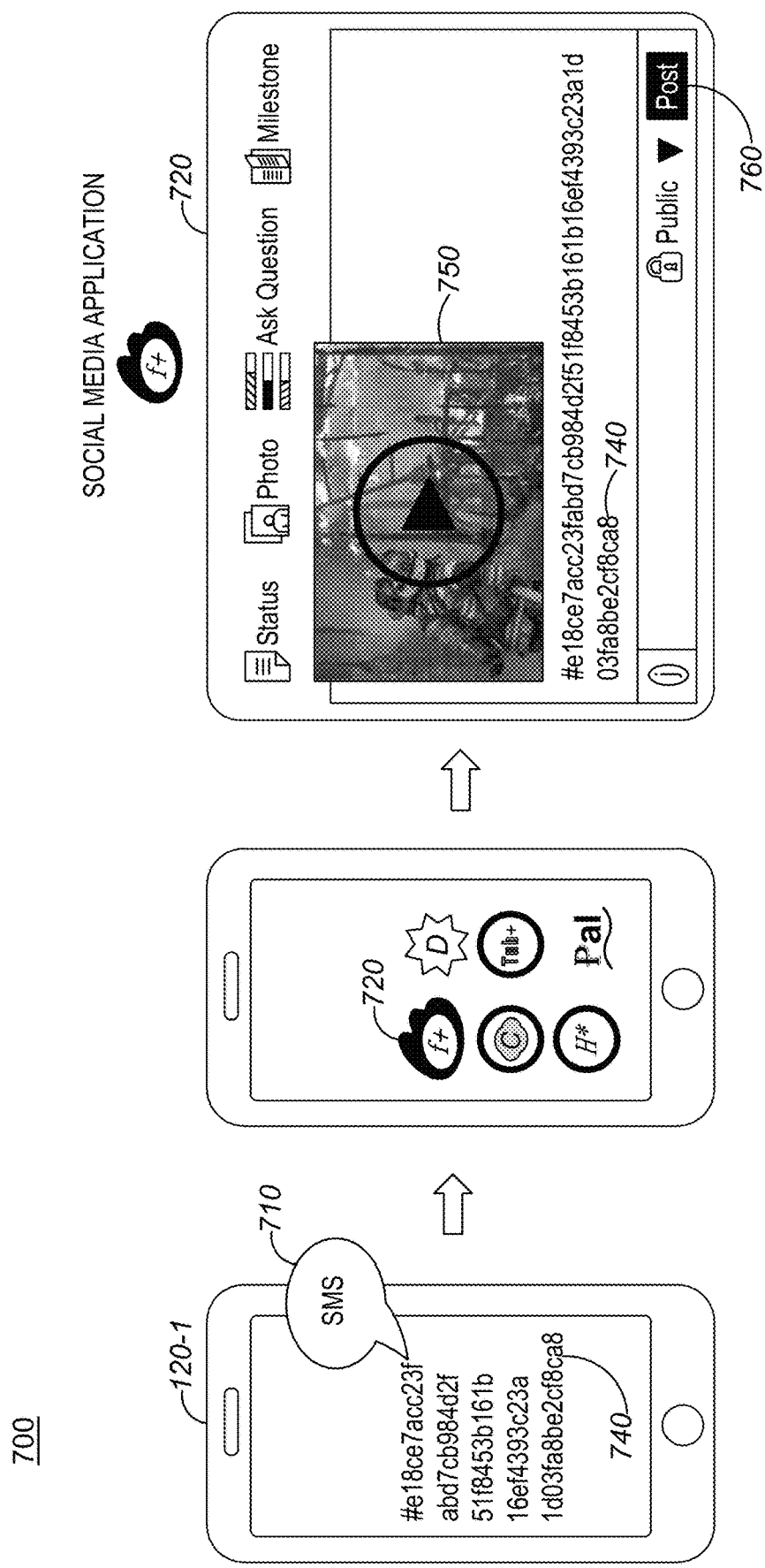
FIG. 7 shows an example workflow to illustrate a process of uploading social media content via a communication device receiving the electronic message including a concatenated string in accordance with some embodiments.

In FIG. 7, assume that a communication device 120-1 receives a SMS message 710 including a concatenated string 740 that is specifically created by the electronic computing device for the purpose of enabling the communication device 120-1 to post social media content corresponding to a particularly selected incident. When a user selects (e.g., by clicking) a link included in the SMS message 710, an application programming interface (API) may trigger a specific social media application to be launched at the communication device 120-1. Alternatively, as shown in FIG. 7, an application programming interface may generate an interface that provides a list of social media applications that are installed at the communication device 120-1. The user may then select a social media application 720 through which the user wishes to post social media content. In response, the selected social media application 720 is launched at the communication device 120-1. In particular, when the social media application 720 is launched, the concatenated string 740 included in the SMS message 710 is automatically attached to a social media post 760 to allow the user to post incident-specific social content 750 (e.g., a video capturing a fire incident) tagged under the concatenated string.

Figure 8:
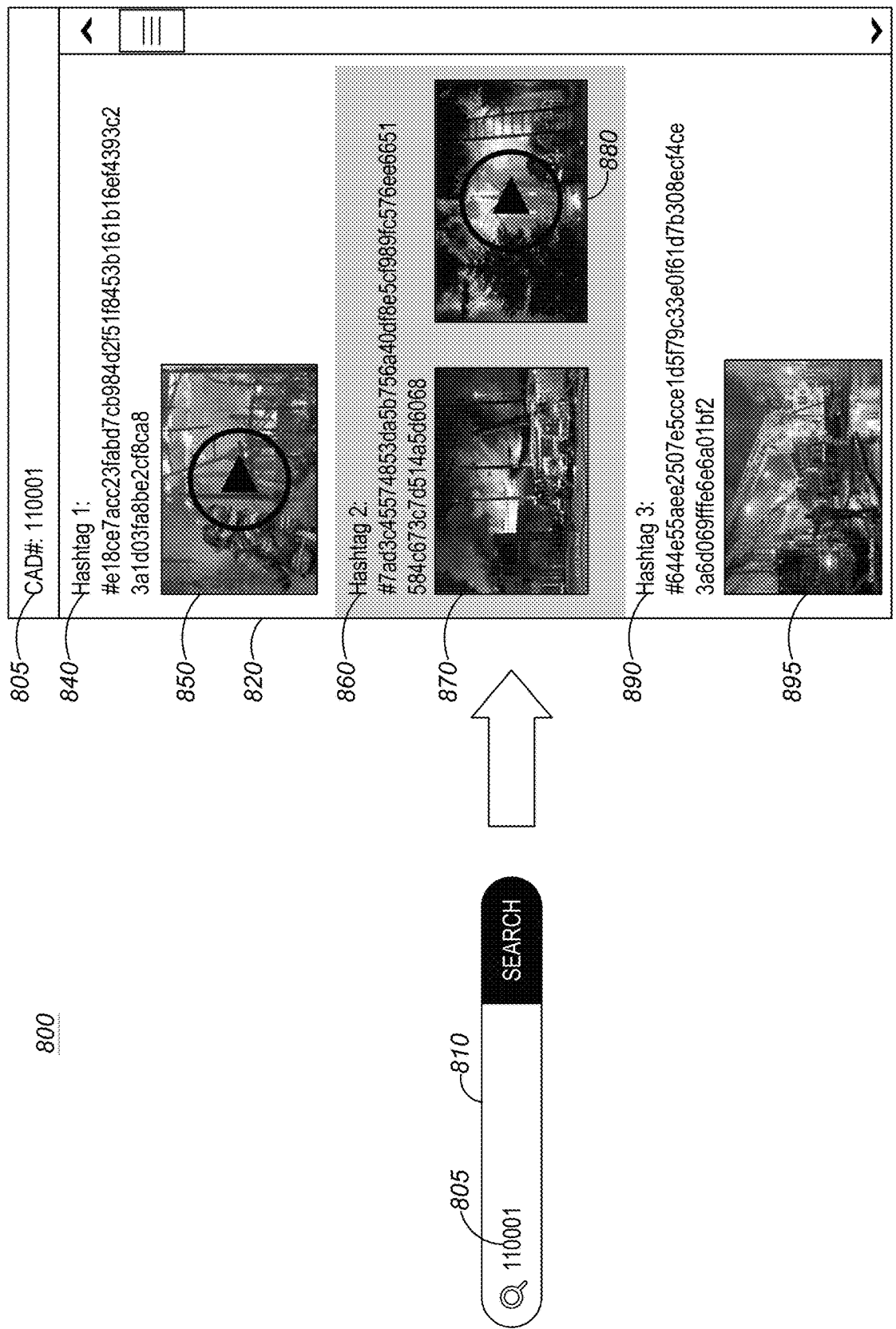
FIG. 8 shows an example workflow to illustrate a process of searching social media content posted by particularly identified communication devices in accordance with some embodiments.

Now referring to FIG. 8, an example workflow 800 is shown to illustrate a process of searching social media content posted by particularly identified communication devices 120. A search query interface 810 is implemented at the electronic computing device or another communication device operated, for example, by a public safety agency, is shown. The search query interface 810 allows the user to enter a keyword for which the user is interested to view incident-specific social media content. In the example workflow 800 shown in FIG. 8, the user enters an incident identifier "11001" 805 for which the user is interested to view incident-specific social media content. However, the user may also enter another keyword that represents the incident identifier such as "fire incident" or "incident at 123 main Street" to search for social media content that were uploaded corresponding to the incident. Assuming that the electronic computing device maintains the concatenated string mapping information as shown in FIG. 6, the incident identifier "11001" 805 is mapped to three different concatenated strings (i.e., hashtags 840, 860, 890) for posting social media content corresponding to the same incident (identified by incident identifier 805) via three different communication devices 120. Accordingly, in this case, the electronic computing device searches the social media content posted via the three particular communication devices by filtering the social media content posted on one or more social media networks on the basis of the respective concatenated strings. As shown in FIG. 8, a search results interface 820 is generated and presented via a display screen implemented at the electronic computing device. The search results interface 820 identifies the incident identifier 805 and further provides the list of concatenated strings (i.e., hashtags 840, 860, 890) and the corresponding social media content (850, 870, 880, 895) tagged under the respective concatenated strings. In case a particular communication device 120 uploads more than one social media post tagged under the same concatenated string, all social media posts uploaded under the same concatenated string by the particular communication device 120 are displayed via the search results interface 820.

In accordance with some embodiments, when the electronic computing device determines during the search process that there are multiple social media posts that are available on social media networks and further tagged (i.e., attached to the string) under the same concatenated string. For example, referring to FIG. 8, the social media content 870 and 880 are both attached to the same concatenated string. In this case, prior to presenting all the social media posts that are attached to the same concatenated string, the electronic computing device determines whether the social media posts are posted via at least two different user profiles. In other words, suppose in the example shown in FIG. 8, when a first social media content 870 is posted via a first user profile and a second social media content 880 is posted via a second user profile that is different than the first user profile, then the electronic computing device may determine that the social media content tagging the same concatenated string are posted by two different users. The electronic computing device may extract publicly available information (e.g., user name, location etc.,) associated with the user profile posting social media content. If the information associated with the user profile posting the first social media content does not match with the information associated with the user profile posting the second social media content, then the electronic computing device may determine that the first and second social media content 870, 880 are posted via different user profiles. In this case, the electronic computing device may present only the earliest posted social media content from among the first and second social media content 870, 880. For example, if the first social media content 870 was posted earlier than the second social media content 880, then the electronic computing device retrieves and presents only the first social media content 870 that is tagged under the concatenated string 860. Alternatively, when the information associated with the user profile posting the first social media content 870 matches with the information associated with the user profile posting the second social media content 880, the electronic computing device may retrieve and present both the first social media content 870 and second social media content 880 that are tagged under the concatenated string 860 as displayed in the search results interface 820 shown in FIG. 8.

Figure 9:
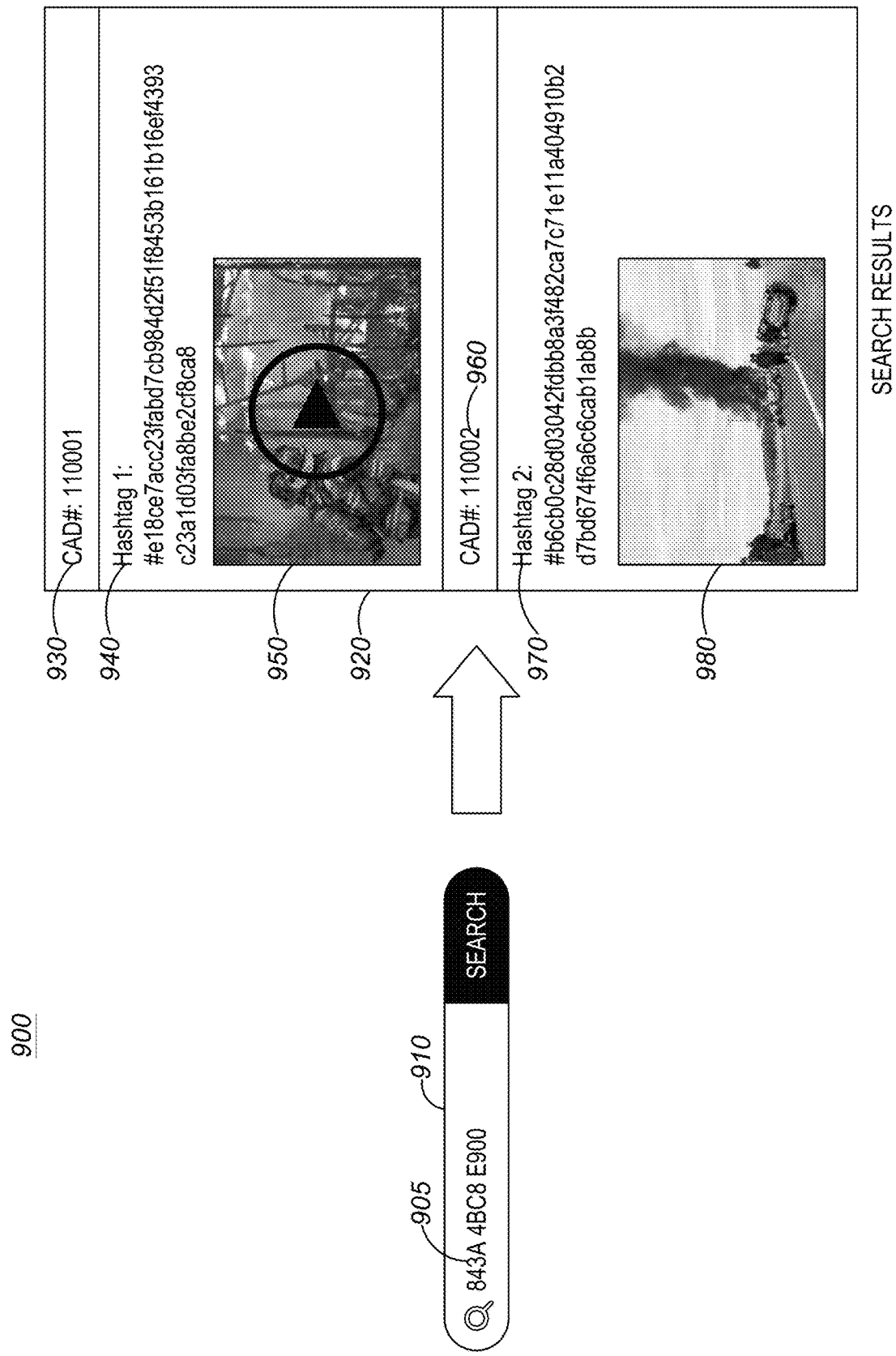
FIG. 9 shows another example workflow to illustrate a process of searching social media content posted by particularly identified communication devices in accordance with some embodiments.

Now referring to FIG. 9, an example workflow 900 is shown to illustrate a process of searching social media content posted by particularly identified communication devices 120. A search query interface 910 is implemented at the electronic computing device or another communication device operated, for example, by a public safety agency, is shown. The search query interface 910 allows the user to enter a keyword for which the user is interested to view incident-specific social media content. In the example workflow 900 shown in FIG. 9, the user enters a device identifier "843A 4BC8 E900" 905 corresponding to a particularly identified communication device 120. Even though a MAC address is shown as entered by the user, the user may also enter another keyword that represents the device identifier to search for social media content that were uploaded via a specific communication device 120. Assuming that the electronic computing device maintains the concatenated string mapping information as shown in FIG. 6, the device identifier "843A 4BC8 E900" 905 is mapped to two different concatenated strings (i.e., hashtags 940, 970) for posting social media content corresponding to the two different incidents (identified by incident identifiers "110001" 930 and "110002" 960). Accordingly, in this case, the electronic computing device searches the social media content posted via the communication device with the device identifier "843A 4BC8 E900" 905 by filtering the social media content posted on one or more social media networks on the basis of the respective concatenated strings 940, 970. As shown in FIG. 9, a search results interface 920 is generated and presented via a display screen implemented at the electronic computing device. The search results interface 920 identifies the incident identifiers 930, 960 and further provides a list of concatenated strings (i.e., hashtags 940, 970) and the corresponding social media content (950, 980) tagged under the respective concatenated strings. In the example shown in FIG. 1, the communication device 120 with the device identifier "843A 4BC8 E900" 905 has posted social media content 950 corresponding to a forest fire incident (i.e., identified by incident identifier "110001" 930) and social media content 980 corresponding to a vehicle collision incident (i.e., identified by incident identifier "110002").

Figure 10:
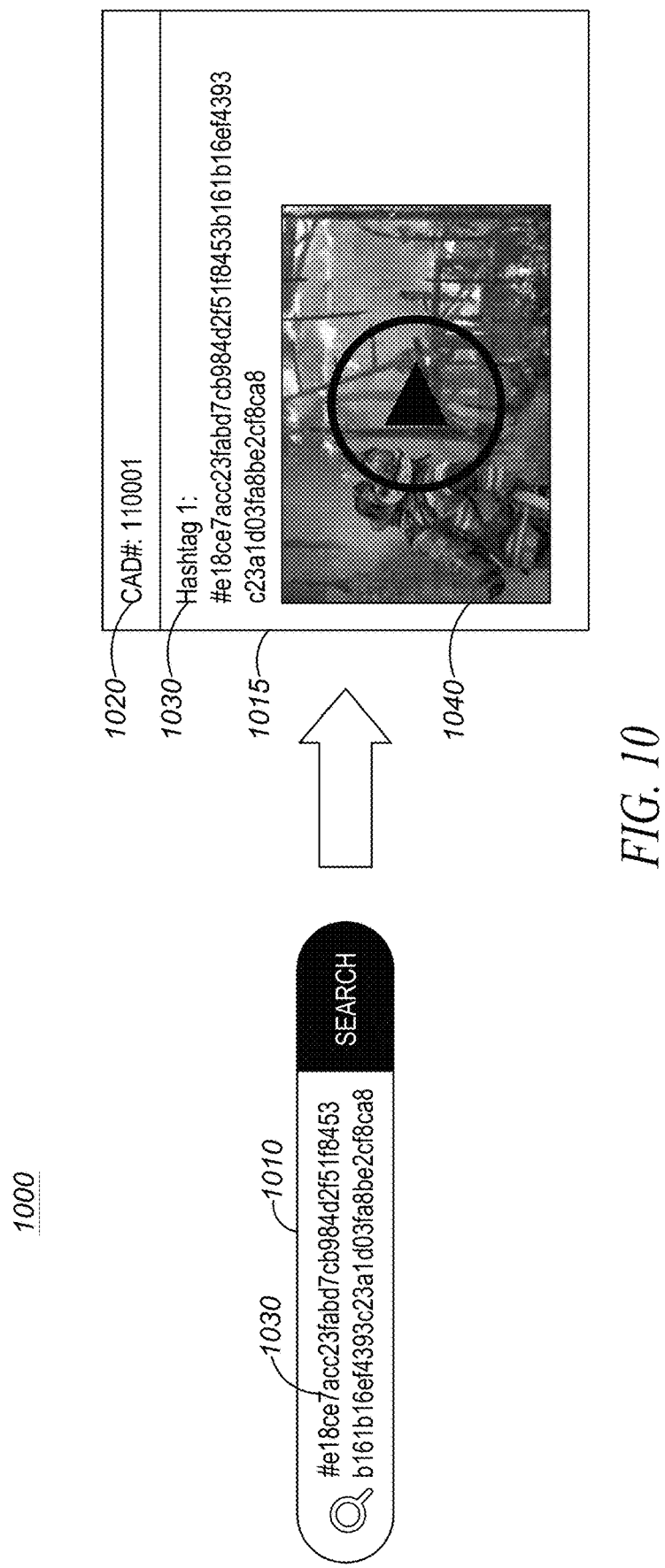
FIG. 10 shows yet another example workflow to illustrate a process of searching social media content posted by particularly identified communication devices in accordance with some embodiments.

Now referring to FIG. 10, an example workflow 1000 is shown to illustrate a process of searching social media content posted by particularly identified communication devices 120. A search query interface 1010 is implemented at the electronic computing device or another communication device operated, for example, by a public safety agency, is shown. The search query interface 1010 allows the user to enter a keyword for which the user is interested to view incident-specific social media content. In the example workflow 1000 shown in FIG. 10, the user enters "#e18ce7acc23fabd7cb984d2f51a453b161b16ef4393-c23a1d03fa8be2cf8ca8" 1030 to represent a concatenated string or hashtag that was generated for enabling the particular communication device 120 to post social media content corresponding to a particular incident. In this case, the electronic computing device searches the social media content that are tagged under the concatenated string (i.e., hashtag 1030) by filtering the social media content posted on one or more social media networks on the basis of the concatenated string (i.e., hashtag 1030). As shown in FIG. 10, a search results interface 1015 is generated and presented via a display screen implemented at the electronic computing device. The search results interface 1015 identifies the incident identifier 1020 and the corresponding social media content 1040 tagged under the hashtag 1030. Optionally, the search results interface 1015 may also show the device identifier "843A 4BC8 E900" corresponding to the communication device 120 which posted social media content 1040 that was tagged under the hashtag 1030.

In accordance with embodiments described herein, systems, devices, and methods disclosed herein can be advantageously employed to improve the searchability of incident-specific social media content posted via particularly identified communication devices 120. In particular, communication devices 120 are particularly identified for the purpose of enabling them to post incident-specific social media content based on whether they were operating near the incident location at the time of occurrence of the incident. Unique concatenated strings, i.e., hashtags are generated for each identified communication device 120 to allow them to post social media content corresponding to a particular incident for which the concatenated string was generated. The unique concatenated string improves the searchability of social media content by searching social media content included in only those social media posts to which the concatenated string was attached. This in turn ensures retrieval of only those social media content that were captured corresponding to a particularly identified incident and further posted by a particularly identified communication device 120. Further, since there is a possibility that a concatenated string may be reused by other users for posting social media posts after it is made publicly available through a social media post that was initially posted by tagging the concatenated string, it is not necessary that other users would be uploading social media content corresponding to the same incident for which the concatenated string was created. This may lead to presenting search results with social media content that may be irrelevant to the incident for which the concatenated string was created. To address this issue, the embodiments described herein identify a particular user profile through which social media content was first posted with the concatenated string attached to it and further retrieves and present search results with only the social media content posted via the particular user profile with the concatenated string attached to it.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for improving the searchability of incident-specific social media content posted via communication devices, the method comprising:

obtaining, at an electronic computing device, incident information identifying an incident location associated with an incident and time of occurrence of the incident;

identifying, at an electronic computing device, at least one communication device located within a predetermined geographical area relative to the incident location during a time of occurrence of the incident;

generating, at the electronic computing device, a concatenated string as a function of a first identifier associated with the incident and a second identifier associated with the at least one communication device; and transmitting, at the electronic computing device, an electronic message including the concatenated string to the at least one communication device, the electronic message including a link to enable the concatenated string to be attached to one or more social media posts including incident-specific social media content posted via the at least one communication device on at least one of a plurality of social media networks.

2. The method of claim 1, further comprising:

receiving, at the electronic computing device, a search query to search for incident-specific social media content, the search query including one or more of the concatenated string, the first identifier, or the second identifier, and responsively searching social media content uploaded on the social media networks to retrieve at least one of the one or more social media posts including incident-specific social media content to which the concatenated string is attached; and one of (i) providing a visual or audio output indicating the retrieved one or more social media posts to which the concatenated string is attached, and (ii) uploading the retrieved one or more social media posts to which the concatenated string is attached to an evidence database.

3. The method of claim 2, wherein searching social media content comprises:

determining that there are a plurality of social media posts to which the concatenated string is attached;

determining that the plurality of social media posts are posted via at least two different user profiles on the social media networks;

identifying, from the plurality of social media posts, a social media post that was posted earlier than the other of the plurality of social media posts; and selecting a user profile that posted the identified social media post, wherein the retrieved at least one of the one or more social media posts include only the social media posts posted via the selected user profile.

4. The method of claim 1, wherein generating comprises:

applying a hash function to the first identifier to generate a first hash value;

applying the hash function to the second identifier to generate a second hash value; and applying a concatenate function to the first hash value and the second hash value to generate the concatenated string.

5. The method of claim 1, wherein generating comprises:

applying a concatenate function to the first identifier and the second identifier to generate a pre-concatenated string: and applying a hash function to the pre-concatenated string to generate a hash value representing the concatenated string.

6. The method of claim 1, wherein generating comprises applying a hash function to the first identifier to generate a first hash value;

applying the hash function to the second identifier to generate a second hash value;

applying a concatenate function to the first hash value and the second hash value to generate a pre-concatenated string; and applying the hash function to the pre-concatenated string to generate the concatenated string.

7. The method of claim 1, wherein the electronic message further includes a link to launch a social media application that allows the at least one communication device to post the one or more social media posts with the concatenated string automatically attached to it.

8. The method of claim 1, further comprising:

identifying, at an electronic computing device, at least one other communication device located within the predetermined geographical location during the time of occurrence of the incident;

generating, at the electronic computing device, a second concatenated string as a function of the first identifier associated with the incident and a third identifier associated with the at least one other communication device; and transmitting, at the electronic computing device, a second electronic message including the second concatenated string to the identified at least one other communication device, the second electronic message including a link to enable the second concatenated string to be attached to one or more social media posts including incident-specific social media content posted by the at least one other communication device on at least one of the social media networks.

9. The method of claim 8, further comprising:

receiving, at the electronic computing device, a search query to search for incident-specific social media content, the search query including one or more of the second concatenated string, the first identifier, or the third identifier, and responsively searching social media content uploaded on the social media networks to retrieve at least one of the one or more social media posts including incident-specific social media content to which the second concatenated string is attached; and one of (i) providing a visual or audio output indicating the retrieved social media post to which the second concatenated string is attached, and (ii) uploading the retrieved social media post to which the second concatenated string is attached to an evidence database.

10. The method of claim 1, further comprising:

storing concatenated string mapping information that maps the concatenated string to the first identifier and the second identifier.

11. The method of claim 1, wherein identifying the at least one communication device comprises:

transmitting a request to a service provider to provide a list of communication devices operating in a particular service area overlapping the geographical area; and identifying the at least one communication device from the list of communication devices received from the service provider.

12. An electronic computing device, comprising:

a transceiver; and an electronic processor communicatively coupled to the transceiver, wherein the electronic processor is configured to:

obtain incident information identifying an incident location associated with an incident and time of occurrence of the incident;

identify at least one communication device located within a predetermined geographical area relative to the incident location during a time of occurrence of the incident;

generate a concatenated string as a function of a first identifier associated with the incident and a second identifier associated with the at least one communication device; and transmit, via the transceiver, an electronic message including the concatenated string to the at least one communication device, the electronic message including a link to enable the concatenated string to be attached to one or more social media posts including incident-specific social media content posted via the at least one communication device on at least one of a plurality of social media networks.

13. The electronic computing device of claim 12, wherein the electronic processor is configured to:

receive a search query to search for incident-specific social media content, the search query including one or more of the concatenated string, the first identifier, or the second identifier, and responsively searching social media content uploaded on the social media networks to retrieve at least one of the one or more social media posts including incident-specific social media content to which the concatenated string is attached; and provide a visual or audio output indicating the retrieved one or more social media posts to which the concatenated string is attached or upload the retrieved one or more social media posts to which the concatenated string is attached to an evidence database.

14. The electronic computing device of claim 13, wherein the electronic processor is configured to:

determine that there are a plurality of social media posts to which the concatenated string is attached;

determine that the plurality of social media posts are posted via at least two different user profiles on the social media networks;

identify, from the plurality of social media posts, a social media post that was posted earlier than the other of the plurality of social media posts; and select a user profile that posted the identified social media post, wherein the retrieved at least one of the one or more social media posts include only the social media posts posted via the selected user profile.

15. The electronic computing device of claim 12, wherein the electronic processor is configured to:

apply a hash function to the first identifier to generate a first hash value;

apply the hash function to the second identifier to generate a second hash value; and apply a concatenate function to the first hash value and the second hash value to generate the concatenated string.

16. The electronic computing device of claim 12, wherein the electronic processor is configured to:

apply a concatenate function to the first identifier and the second identifier to generate a pre-concatenated string; and apply a hash function to the pre-concatenated string to generate a hash value representing the concatenated string.

17. The electronic computing device of claim 12, wherein the electronic processor is configured to:

apply a hash function to the first identifier to generate a first hash value;

apply the hash function to the second identifier to generate a second hash value;

apply a concatenate function to the first hash value and the second hash value to generate a pre-concatenated string; and apply the hash function to the pre-concatenated string to generate the concatenated string.

18. The electronic computing device of claim 12, wherein the electronic processor is configured to:

identify at least one other communication device located within the predetermined geographical location during the time of occurrence of the incident;

generate a second concatenated string as a function of the first identifier associated with the incident and a third identifier associated with the at least one other communication device; and transmit, via the transceiver, a second electronic message including the second concatenated string to the at least one other communication device, the second electronic message including a link to enable the second concatenated string to be attached to one or more social media posts including incident-specific social media content posted by the at least one other communication device on at least one of the social media networks.

19. The electronic computing device of claim 18, wherein the electronic processor is configured to:

receive a search query to search for incident-specific social media content, the search query including one or more of the second concatenated string, the first identifier, or the third identifier, and responsively searching social media content uploaded on the social media networks to retrieve at least one of the one or more social media posts including incident-specific social media content to which the second concatenated string is attached; and provide a visual or audio output indicating the retrieved one or more social media posts to which the second concatenated string is attached or upload the retrieved one or more social media posts to which the second concatenated string is attached to an evidence database.

20. The electronic computing device of claim 12, wherein the electronic processor is configured to:

transmit, via the transceiver, a request to a service provider to provide a list of communication devices operating in a particular service area overlapping the geographical area; and identify the at least one communication device from the list of communication devices received from the service provider.

* * * * *